United States Patent
Dirik et al.

(10) Patent No.: US 11,899,591 B2
(45) Date of Patent: *Feb. 13, 2024

(54) DYNAMICALLY SIZED REDUNDANT WRITE BUFFER WITH SECTOR-BASED TRACKING

(71) Applicant: Micron Technology, Inc., Boise, ID (US)

(72) Inventors: Cagdas Dirik, Indianola, WA (US); Robert M. Walker, Raleigh, NC (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,036

(22) Filed: Dec. 7, 2022

(65) Prior Publication Data

US 2023/0102184 A1 Mar. 30, 2023

Related U.S. Application Data

(63) Continuation of application No. 16/876,967, filed on May 18, 2020, now Pat. No. 11,550,725.

(51) Int. Cl.
*G06F 12/08* (2016.01)
*G06F 11/07* (2006.01)
(Continued)

(52) U.S. Cl.
CPC ...... *G06F 12/0891* (2013.01); *G06F 11/0772* (2013.01); *G06F 11/3037* (2013.01);
(Continued)

(58) Field of Classification Search
CPC ............. G06F 12/0891; G06F 11/0772; G06F 11/3037; G06F 12/0815; G06F 12/0893;
(Continued)

(56) References Cited

U.S. PATENT DOCUMENTS 5,819,054 A * 10/1998 Ninomiya ............. G06F 3/0658
711/E12.019
6,490,657 B1 12/2002 Masubuchi et al.
(Continued)

OTHER PUBLICATIONS

Ex Parte Quayle Action, U.S. Appl. No. 16/877,036, filed Oct. 5, 2021, 6 pages.
(Continued)

*Primary Examiner* — Masud K Khan
(74) *Attorney, Agent, or Firm* — NICHOLSON DE VOS WEBSTER & ELLIOTT LLP

(57) ABSTRACT

Exemplary methods, apparatuses, and systems include detecting an operation to write dirty data to a cache. The cache is divided into a plurality of channels. In response to the operation, the dirty data is written to a first cache line in the cache, the first cache line being accessed via a first channel. Additionally, a redundant copy of the dirty data is written to a second cache line in the cache. The second cache line serves as a redundant write buffer and is accessed via a second channel, the first and second channels differing from one another. A metadata entry for the second cache line is updated to reference a location of the dirty data in the first cache line.

20 Claims, 10 Drawing Sheets

(51) Int. Cl.
  *G06F 11/30* (2006.01)
  *G06F 13/16* (2006.01)
  *G06F 12/0891* (2016.01)
  *G06F 12/0893* (2016.01)
  *G06F 12/0815* (2016.01)

(52) U.S. Cl.
  CPC ...... *G06F 12/0815* (2013.01); *G06F 12/0893* (2013.01); *G06F 13/1673* (2013.01); *G06F 2212/7207* (2013.01)

(58) Field of Classification Search
  CPC ......... G06F 13/1673; G06F 2212/7207; G06F 11/1666
  See application file for complete search history.

(56) References Cited

U.S. PATENT DOCUMENTS

| | | | |
|---|---|---|---|
| 6,801,203 | B1 | 10/2004 | Hussain |
| 2014/0040552 | A1 | 2/2014 | Rychlik et al. |
| 2016/0062892 | A1* | 3/2016 | Guthrie .................. G06F 12/12 711/122 |
| 2016/0085677 | A1* | 3/2016 | Loh .................... G06F 12/0864 711/143 |
| 2016/0378593 | A1 | 12/2016 | Takeda et al. |
| 2018/0189178 | A1* | 7/2018 | Kaminski ........... G06F 12/0804 |
| 2019/0272122 | A1 | 9/2019 | Xioa et al. |
| 2021/0124689 | A1 | 4/2021 | Kucherov et al. |

OTHER PUBLICATIONS

Final Office Action, U.S. Appl. No. 16/876,967, dated Sep. 14, 2021, 14 pages.
Non-Final Office Action, U.S. App. No. 16/876,967, dated Jun. 23, 2021, 11 pages.
Non-Final Office Action, U.S. App. No. 16/876,967, dated Apr. 18, 2022, 12 pages.
Notice of Allowance, U.S. App. No. 16/876,967, dated Sep. 15, 2022, 8 pages.
Notice of Allowance, U.S. App. No. 16/877,036, dated Dec. 3, 2021, 8 pages.
Notice of Allowance, U.S. App. No. 17/704,561, dated Nov. 17, 2022, 8 pages.

* cited by examiner

FIG. 2

CACHE 200

Channel 0

| | Way 0 | | Way 1 | | Way 2 | | Way 3 | |
|---|---|---|---|---|---|---|---|---|
| Set 0 | W0 | W5 | W3 | | W2 | | T2 | |
| Set 1 | | | | | | | T3 | D4 |
| Set 2 | | | | | | | D6 | D1 |
| Set 3 | | | | | | | | |

Channel 1

| | Way 0 | | Way 1 | | Way 2 | | Way 3 | |
|---|---|---|---|---|---|---|---|---|
| Set 0 | | | | | T1 | | T0 | D3 |
| Set 1 | W1 | | | | W4 | | D5 | D2 |
| Set 2 | | | | | | | | D0 |
| Set 3 | W6 | | | | | | | |

FIG. 3

| Buffer Sector 2 | | Buffer Sector 1 | | Buffer Sector 0 | |
|---|---|---|---|---|---|
| Original Way | Original Sector | Original Way | Original Sector | Original Way | Original Sector |

Channel 1, Set 0, Way 3, Sector 3:

| Buffer Sector 2 | | Buffer Sector 1 | | Buffer Sector 0 | |
|---|---|---|---|---|---|
| Way 1 | Sector 2 | Way 2 | Sector 2 | Way 0 | Sector 1 |

DYNAMICALLY SIZED REDUNDANT WRITE BUFFER WITH SECTOR-BASED TRACKING

CROSS-REFERENCE TO RELATED APPLICATION

The present application is a continuation of U.S. patent application Ser. No. 16/876,967 filed May 18, 2020, which is hereby incorporated by reference.

TECHNICAL FIELD

The present disclosure generally relates to maintaining and tracking data and redundant copies of data within a cache, and more specifically, relates to a dynamically sized redundant write buffer within a cache with sector-based tracking.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates an example of redundant write buffers within a cache.

FIG. 3 illustrates an example organization of metadata for a redundant write buffer.

FIG. 4 illustrates an example of metadata for a redundant write buffer as shown in FIG. 2.

DETAILED DESCRIPTION

Figure 1:
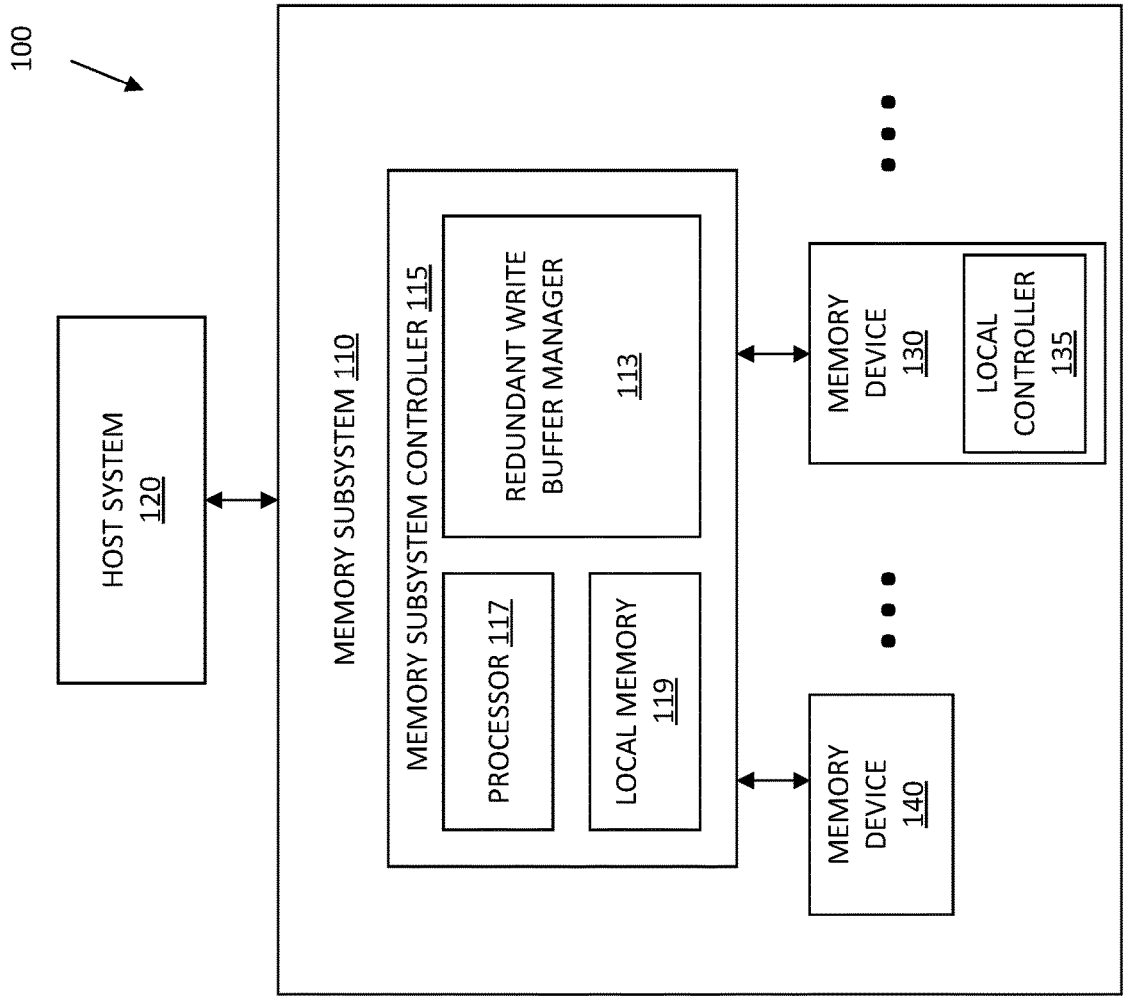
FIG. 1 illustrates an example computing environment that includes a memory subsystem in accordance with some embodiments of the present disclosure.

Aspects of the present disclosure are directed to a memory subsystem maintaining and tracking data and redundant copies of data within a cache. In particular, embodiments implement a dynamically sized redundant write buffer within a cache with sector-based tracking. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The memory devices can include, for example, non-volatile memory devices (e.g., NAND). Other types of memory devices, including volatile memory devices, are described in greater detail below in conjunction with FIG. 1. The host system can provide data to be stored at the memory subsystem and can request data to be retrieved from the memory subsystem.

A cache is a volatile memory component that can fulfill read requests faster than a non-volatile memory component. For efficiencies in cost and speed, the size of a cache is small relative to the underlying non-volatile memory. In some caches, memory subsystems write new and updated data values to the cache first, mark the data as dirty, and later write the data to non-volatile memory in accordance with a cleaning, eviction, or another policy. Should an uncorrectable error or other failure occur resulting in an inability to read the data while it is still dirty, the data is lost. Some systems require high reliability but are limited in the level of error checking and correction that can be used to recover data.

Aspects of the present disclosure address the above and other issues by efficiently maintaining and tracking redundant copies of dirty data within the cache. For example, embodiments write an original copy of dirty data to a first cache line and a redundant copy of dirty data to a second cache line. The second cache line serves as a redundant write buffer and is accessed via a separate channel than the first cache line for increased reliability. The first and second cache lines can share a common or otherwise use a consistently predictable addressable unit to simplify the tracking of redundant copies. For example, if the first and second cache lines have common set values, embodiments can limit tracking redundant copies to referencing a way value and sector value. A metadata entry associated with the second cache line references the location of the dirty data in the first cache line using this simplified approach. As a result, memory subsystems can provide high reliability in dirty data.

Some memory subsystems utilize multiple layers of caches, e.g., a sector-based cache layer and a page cache layer. A sector-based cache divides the cache into addressable units, including channels, sets, ways, and sectors. In contrast, a page cache divides the cache into channels, sets, and ways, but does not address individual sectors within ways. Given the lack of addressable sectors within a page cache, implementations of a page cache call for a cache line from a way of a sector-based cache to be cleaned before migrating to the page cache. Duplicating an entire cache line to provide reliability for dirty data is inefficient. Additionally, implementations of a page cache write an entire cache line to non-volatile memory upon eviction, cleaning, etc. As a result, any portion of the cache line that includes clean data is unnecessarily rewritten to non-volatile memory.

Aspects of the present disclosure address the above and other issues by tracking sector-based redundant copies of dirty data within a page cache. For example, embodiments use the redundant write buffer metadata to track sector-sized portions of cache lines in a page cache. As a result, dirty sectors of data do not need to be cleaned when migrated to the page cache. Additionally, embodiments can write dirty data from the page cache to non-volatile memory while omitting clean data from the same cache line.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random-access memory (RAM), such as static random-access memory (SRAM), dynamic random-access memory (DRAM), and synchronous dynamic random-access memory (SDRAM). For example, memory devices 140 can implement one or more caches.

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple-level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), Spin Transfer Torque (STT)-MRAM, conductive bridging RAM (CBRAM), resistive random-access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem).

In general, the memory subsystem controller 115 can receive commands or operations from the host system 120 (e.g., read and write commands) and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a redundant write buffer manager 113 that can efficiently maintain and track redundant copies of dirty data within the cache. In some embodiments, the controller 115 includes at least a portion of the redundant write buffer manager 113. For example, the controller 115 can include a processor 117 (processing device) configured to execute instructions stored in local memory 119 for performing the operations described herein. In some embodiments, the redundant write buffer manager 113 is part of the host system 110, an application, or an operating system. In some embodiments, the memory devices 130 can be managed memory devices (e.g., managed NAND), which is a raw memory device combined with a local controller 130 for memory management within the same memory device package. A local controller 130 can include a redundant write buffer manager 113.

The redundant write buffer manager 113 can maintain and track redundant copies of dirty data within the cache. In particular, the redundant write buffer manager 113 can repurpose cache lines to create and maintain redundant write buffers and use the redundant write buffers to recover dirty data and manage data migration to and from a cache. Further details with regard to the operations of the redundant write buffer manager 113 are described below.

FIG. 2 illustrates an example of redundant write buffers within a cache 200. In one embodiment, the cache 200 is implemented using a plurality of memory devices 140. The illustrated portion of the cache 200 includes two channels, four sets per channel, and four ways per set. For example, each channel can connect the memory subsystem controller 115 to a separate set of one or more memory devices 140. The portions of the memory devices 140 that make up the cache 200 are addressable using a channel value, a set value, and a way value. In a sector-based cache, each way is further divisible into sectors. For example, a cache line can refer to data written to the four sectors of a given way as illustrated. Additionally, a sector-based version of the cache 200 can maintain metadata (e.g., indicating whether the data is dirty) per sector. This metadata can be stored in tags, as described with reference to FIG. 5. In a page cache, however, such metadata is conventionally maintained per way (or cache line), but not per sector. Such cache lines, however, are still accessible in smaller chunks—e.g., 64-byte, sector-sized portions of data. As such, for the ease of explanation below, the use of "sector" refers to a sector-sized portion of a way or cache line, whether or not said portion is within a sector-based cache.

In one embodiment, a sector can store 64 bytes of data in the cache 200. Using this simple illustration, it follows that a cache line consuming a way can store 256 bytes of data. Other divisions of the cache 200 are possible. In one embodiment, a cache line stores 1 kilobyte of data subdivided into 16 sectors, 2 kilobytes of data subdivided into 32 sectors, or another configuration including a different sector size and/or a different number of sectors.

The cache 200 includes original copies of written dirty data (e.g., W0-W6), duplicate or redundant copies of dirty data (e.g., D0-D6), and redundant write buffer metadata (e.g., T0-T3). The redundant write buffer metadata indicates when a cache line has been repurposed to serve as a redundant write buffer. For example, the metadata can include a flag or other indicator to demonstrate that the cache line is currently a redundant write buffer. As a result, redundant write buffers can be dynamically added and removed as needed.

In one embodiment, the redundant write buffer metadata further includes a mapping between original and redundant copies of data. For example, the metadata can include, in a position associated with a sector of the redundant write buffer, the way value and/or the sector value of the corresponding original copy of the dirty data. Furthermore, the channel value and set value of the original copy of the dirty data can be determined inherently based upon the channel and set values of the redundant write buffer.

In one embodiment, the redundant write buffer manager 113 creates and maintains a redundant write buffer for each set of the cache 200 by maintaining a 1:1 relationship between a set storing original data and the set storing duplicate data. For example, the redundant write buffer manager 113 can maintain redundant write buffer metadata in a set having the same set value as the set storing the original data, but on different channel (e.g., set 0 of channel 1 can store redundant write buffer metadata for original data stored in set 0 of channel 0). In another embodiment, the redundant write buffer manager 113 maintains a one-to-many relationship between the location of the redundant write buffer metadata and the original data (e.g., set 0 of channel 1 can store redundant write buffer metadata for original data stored in multiple sets of channel 0). Embodiments of these mappings are described further with reference to FIGS. 3-6.

FIG. 3 illustrates an example organization of metadata for a redundant write buffer. As described above, in addition to an indicator to demonstrate that the cache line is currently a redundant write buffer, the metadata can include mappings between original and redundant copies of data. Embodiments can store these mappings in a sector of the repurposed cache line as a table or another data structure (e.g., T0, T1, T2, or T3). In one embodiment, an order or other format of the metadata correlates to the other sectors of the redundant write buffer. As illustrated, buffer sector 0 is the metadata entry that refers to the least significant sector value in the corresponding way of the redundant write buffer, buffer sector 1 is the metadata entry that refers to the next least significant sector value in the corresponding way of the redundant write buffer, etc.

In one embodiment, the metadata mapping a redundant copy of dirty data to the original copy of dirty write data includes a way value and a sector value indicating the location of the original dirty data within the way. The set value and channel value of the redundant write buffer can map to the set value and channel value of the dirty write data by way of a consistent relationship. For example, the two channel values can follow a rule of always differing by a value of 1 while the set values can be the same. If dirty data is written to channel 0, set 0, such an embodiment would use a way in channel 1, set 0 to maintain a redundant write buffer. Using different channels can provide data reliability when, e.g., the original data is inaccessible due to a failure that impacts an entire channel of the cache 200. Using the same value for the sets minimizes the amount of processing or storage needed to map redundant copies to original copies. Other consistent relationships between channel values and set values in the mapping, however, can be implemented.

FIG. 4 illustrates an example of metadata for a redundant write buffer as shown in FIG. 2. In particular, this example shows the data structure T0 stored in channel 1, set 0, way 3, sector 3 of the cache 200. The entry labeled buffer sector 0 corresponds to the least significant sector of the repurposed cache line, channel 1, set 0, way 3, sector 0. This entry includes a way value of 1 and a sector value of 2. Implicitly, this entry maps to channel 0, set 0 using the relationship examples above. The metadata in this entry, therefore, maps the redundant copy of dirty data stored in channel 1, set 0, way 3, sector 0, D0, to the original copy of dirty data stored in channel 0, set 0, way 0, sector 1, W0. The entry labeled buffer sector 1 maps the redundant copy of dirty stored in channel 1, set 0, way 3, sector 1, D2, to the original copy of dirty data stored in channel 0, set 0, way 2, sector 2, W2. The entry labeled buffer sector 2 maps the redundant copy of dirty stored in channel 1, set 0, way 3, sector 2, D3, to the original copy of dirty data stored in channel 0, set 0, way 1, sector 2, W3.

In one embodiment, the data structure mapping original dirty data to redundant copies in a redundant write buffer includes mappings for multiple ways. As such, the format of the data structure storing the redundant write buffer metadata provides for mappings of sectors of the multiple ways. For example, if there was sufficient space in the sector holding T0, the mappings could include an entry for channel 1, set 0, way 2, sector 0 (storing the duplicate data D5). In another embodiment, the data structure is contained to mappings for the same way and sectors of another way are mapped by a data structure within that way—e.g., T1 in channel 1, set 0, way 2, sector 3 can provide mapping metadata for D5.

Figure 5:
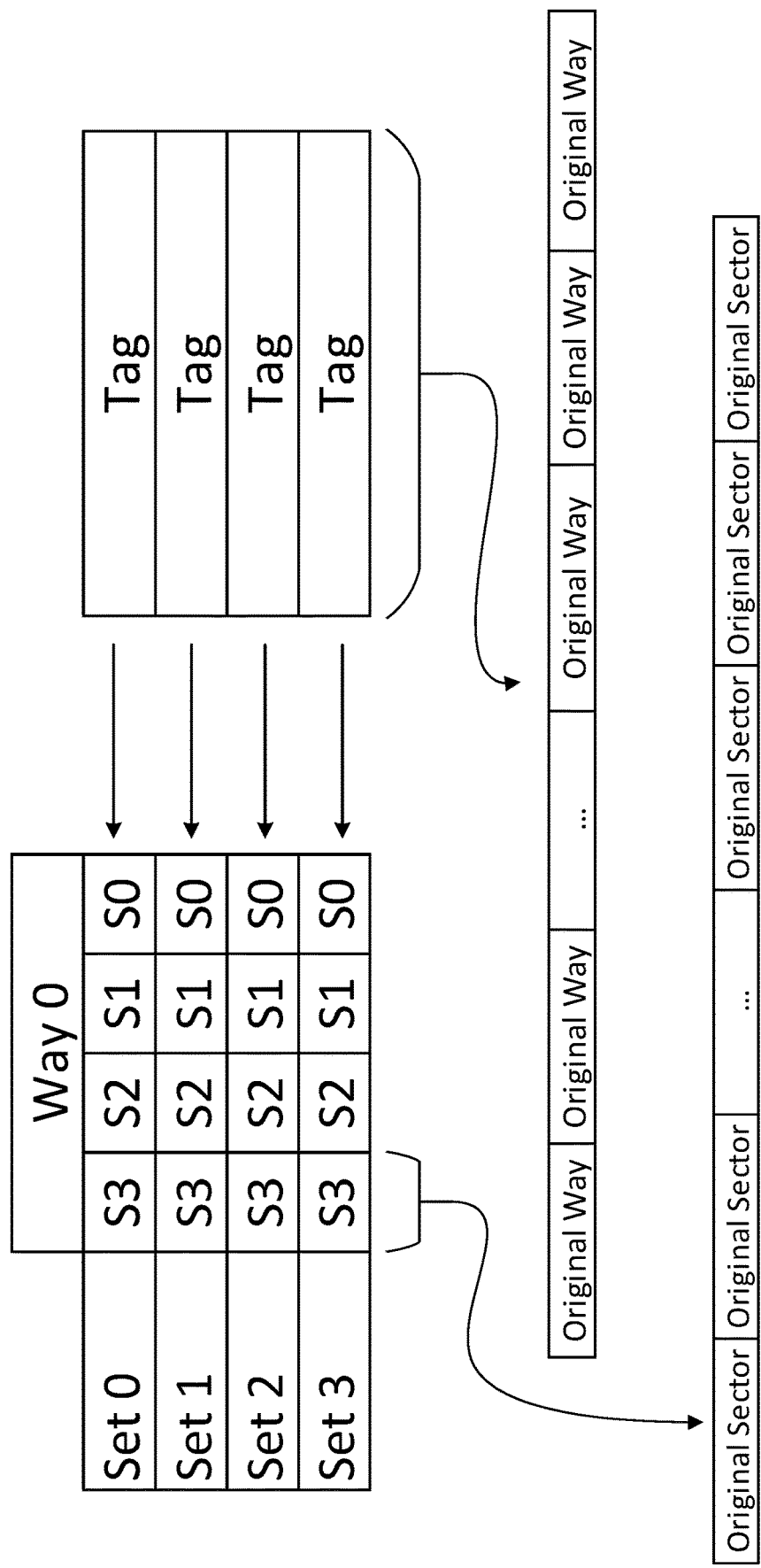
FIG. 5 illustrates another example organization of metadata for a redundant write buffer.

FIG. 5 illustrates another example organization of metadata for a redundant write buffer. As described above, a tag can store metadata for a way or sectors within that way, if the cache is a sector-based cache. For example, tags can include indicators of whether sectors within a way store dirty data. In addition to repurposing a way from ordinary use as a cache line into a redundant write buffer, embodiments can also repurpose tags for the corresponding ways. In one embodiment, there is sufficient space in the tags to store at least some of the mapping metadata in addition to, e.g., indicators/valid bits to track which sectors of the redundant write buffer are currently in use. Some space can be freed by removing the redundancy of dirty status indicators in the non-repurposed tags. For example, the existence of a redundant copy of dirty data can be used to indicate that an original copy stores dirty data. The tag of the original copy of the dirty data, therefore, can free at least one tag bit that would have been used for tracking dirty status to be used for mapping redundant dirty data.

In an embodiment that repurposes these tags, instead of storing way, sector value pairs in a data structure within a sector of the redundant write buffer, the data structure is moved, in whole or part, to the tag or tags for the way repurposed as a redundant write buffer. As a result, embodiments can store a greater number of metadata mappings in a single sector of a redundant write buffer, freeing up other sectors within the set to serve as a part of the redundant write buffer in storing redundant copies of dirty data.

The number of ways per set and sectors per way in the cache can dictate the number of bits needed to track way, sector value pairs and, in turn, impact how much of the redundant data mappings is stored in tags. For example, reducing the number of ways per set from 8 to 4 results in a reduction from 3 bits to track way values to 2 bits to track way values. In one embodiment, increasing the number of channels in the cache results in fewer ways per set.

In the illustrated example, way values are moved into the metadata tags of a redundant write buffer while sector values remain in a sector of the redundant write buffer. As a result, the tag stores a way value for each sector of dirty data in the redundant write buffer—e.g., by maintaining a format that maps a position of the value in the data structure to a sector in the set that stores a redundant copy of dirty data. In one embodiment, the metadata tags include way values (as illustrated) in addition to valid bits (not illustrated). The metadata sector (e.g., set 3, way 0, sector 3) stores a sector value for each sector of dirty data in the write buffer—e.g., by also maintaining a format that maps a position of the value in the data structure to a sector in the set. The combination of the tag and metadata sector serves as the redundant write buffer metadata data structure and provides a mapping between redundant copies of dirty data stored the corresponding sectors within the redundant write buffer for that set to the original copies of the dirty data.

Figure 6:
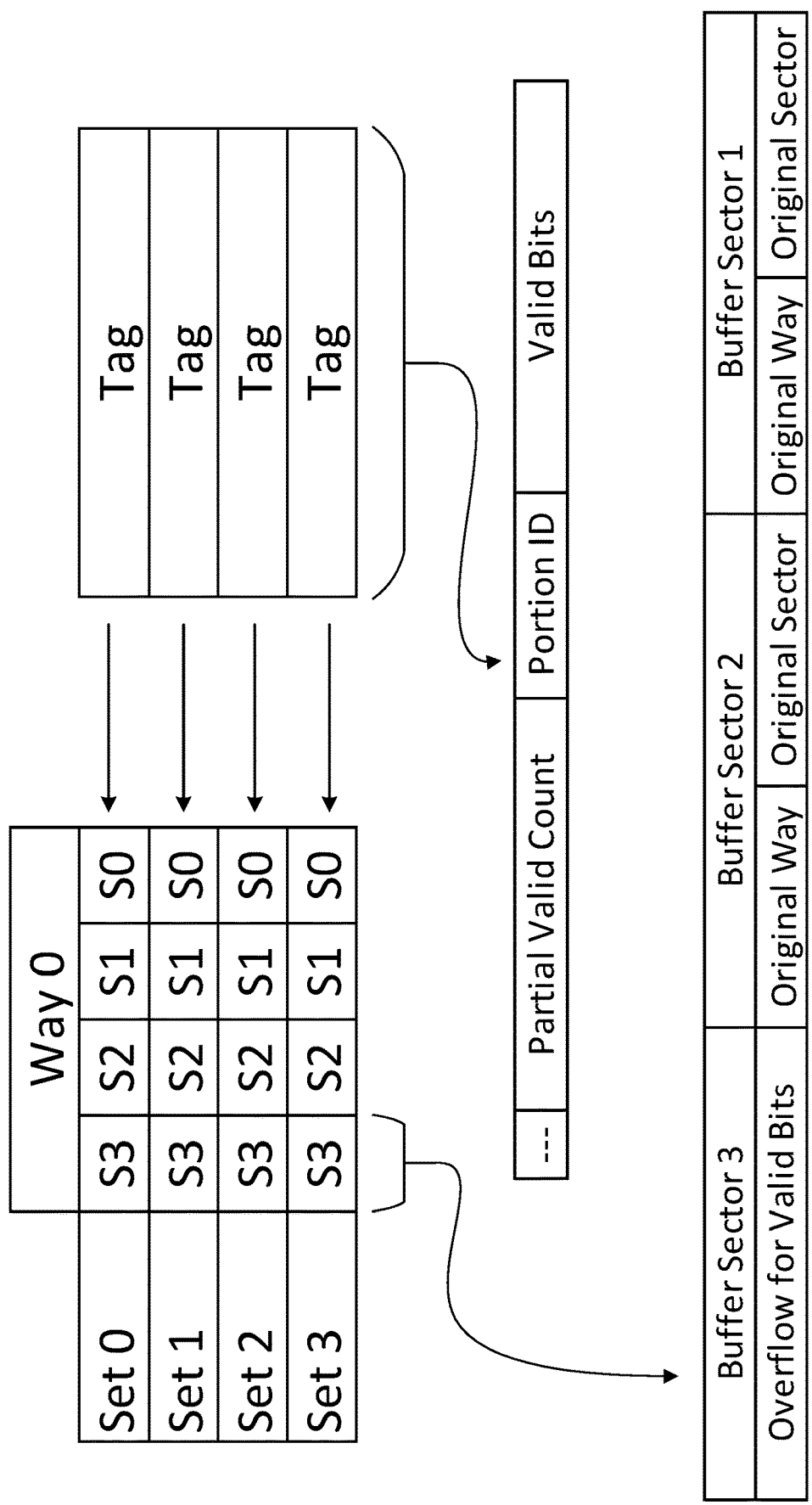
FIG. 6 illustrates yet another example organization of metadata for a redundant write buffer.

FIG. 6 illustrates yet another example organization of metadata for a redundant write buffer. As described above, a page cache tracks less granular metadata (e.g., a dirty indicator per way rather than per sector). Such a design often results in less bits of metadata available to be repurposed in the implementation of a redundant write buffer. A tag, therefore, can have fewer bits available for tracking the valid/invalid status of redundant write buffer sectors. As a result, embodiments can include at least some validity status indicators in the sector of the redundant write buffer that is repurposed to store metadata.

In the illustrated example, the tags have insufficient space to store metadata for validity indicators for each buffer sector. The tag stores validity indicators for a portion of the redundant write buffer. For example, the tag can store half of the valid bits for the sectors of the redundant write buffer. The remaining validity indicators are stored in the metadata sector of the redundant write buffer. The illustrated overflow for valid bits gives an example in which the valid bits consume at least one portion of the metadata sector at way 0, set 3, sector 3, that would otherwise map to a way, sector value pair.

In one embodiment, the tag includes an identifier to indicate which portion of the sectors are represented the tag's valid bits. Continuing the example in which a tag can store half of the valid bits for the sectors of a redundant write buffer, the portion identifier (ID) can indicate whether the tag store valid bits for the first half of sectors or the second half of sectors. In another embodiment, the tag consistently stores the same portion of valid bits and omits the portion ID.

In one embodiment, the tag includes a partial valid count to represent the number of valid sectors represented by valid indicators stored outside of the tag. Embodiments can count the number of valid sectors represented by the portion of valid bits in the tag and combine that count with the partial valid count to determine, e.g., how many dirty sectors are stored by the redundant write buffer. In one embodiment, the redundant write buffer manager 113 uses this total count, when it satisfies a condition or threshold, to trigger a cleaning operation to free up buffer space.

Figure 7:
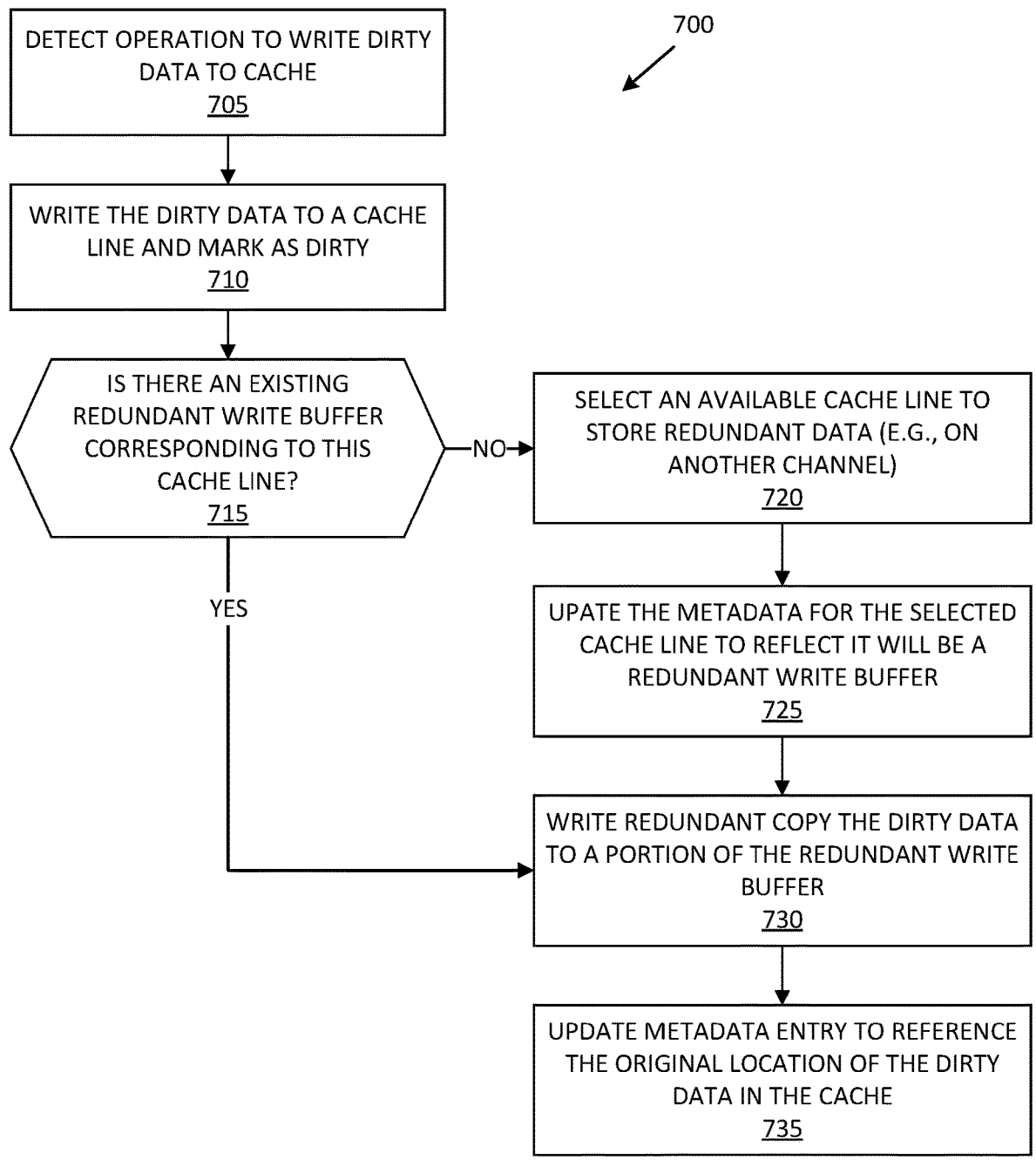
FIG. 7 is a flow diagram of an example method to write redundant dirty data to a cache in accordance with some embodiments of the present disclosure.

FIG. 7 is a flow diagram of an example method 700 to write redundant dirty data to a cache in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the redundant write buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing device receives or otherwise detects an operation to write dirty data to the cache. For example, the host system 120 can direct write requests to the memory subsystem 110. The memory subsystem controller 115 determines that the write request is directed to data currently stored in a cache implemented in the memory device 140. Using the cache 200 illustrated in FIG. 2 as an example, the processing device receives or detects a write of dirty data directed to the cache line stored at channel 0, set 0, way 0, sector 1.

At operation 710, the processing device writes the dirty data to the identified cache line. Continuing the example above using the cache 200, the written data is illustrated as W0. In one embodiment, the processing device updates the metadata for the written sector(s) to indicate that the sector (s) are currently storing dirty data. For example, the processing device sets a dirty bit or otherwise updates an indicator in the tag corresponding to the recently written cache line.

At operation 715, the processing device determines if there is an existing redundant write buffer corresponding to the selected cache line written with dirty data. In one embodiment, the cache is initially (e.g., at startup) allocated without any redundant write buffers. During operation, the processing device can dynamically repurpose one or ways within the cache to serve as a redundant write buffer. Additionally, when a way is no longer needed to store redundant write data, the processing device can return the way to ordinary cache space. As a result, the processing device is able to dynamically scale the redundant write buffer space based upon the current need of the workflow managed by the cache, reducing the storage space cost of providing dirty data reliability.

Continuing the example of dirty data W0 written to channel 0, set 0, way 0, sector 1, the processing device looks for the existence of a redundant write buffer in channel 1, set 0. Embodiments, however, are not limited to searching for a redundant write buffer within the set having the same set value as the original data but on a different channel. In some embodiments, the processing device searches another predictable set for the redundant write buffer or the processing device searches multiple sets for the redundant write buffer (e.g., when a redundant write buffer maintains metadata for multiple sets). As described above, embodiments can use a metadata, such as a buffer bit, to indicate the existence of a redundant write buffer. Embodiments can maintain this indicator in a sector of the repurposed cache line or in the corresponding tag.

In addition to identifying an existing redundant write buffer, the processing device can determine if the existing write buffer already contains old data for the corresponding sector (e.g., to be overwritten) or available space in the buffer to write a redundant copy of the dirty data. For example, when data can be overwritten, the processing device parses the metadata maintained for the buffer to determine if any way, sector value pairs match the way, sector value pair for the recently written dirty data. Otherwise, or if a match is not found, the processing device looks for a sector in an existing buffer that does not contain valid data.

In one embodiment, the processing device fills a redundant buffer in a linear manner. For example, as the processing device adds redundant data to the buffer, it follows a predetermined order, such as starting with the least significant sector value and searching for an invalid sector in increasing order of sector values. When the processing device evicts or otherwise invalidates redundant data, the processing device compresses remaining valid sectors toward the least significant sectors. If new dirty data is copied to the buffer for a sector that already stores a redundant copy of old dirty data, the processing device will read the most recent copy based upon the linear order when evicting or recovering data.

If there is not an existing redundant write buffer for this cache line (e.g., metadata sectors T0 and T1 have yet to be written to create buffer space) or there is not an existing buffer with available space, the method 700 proceeds to operation 720 to repurpose a cache line to serve as a buffer. If there is an existing redundant write buffer (e.g., metadata sector T0 has been written, repurposing the cache line at way 3 to serve as a buffer), the method 700 proceeds to operation 730.

At operation 720, the processing device selects an available way/cache line to create a new redundant write buffer. For example, the processing device looks for an empty way in a set having the same set value as the original copy of the dirty data, but on a different channel. For the dirty data W0, the processing device would look for an available way in channel 1, set 0. The processing device can search for an available way from the most significant way value to the least significant way value, from the least significant to the most significant, or via another search method. If way 3 had yet to be repurposed and written with redundant data, this operation could select way 3 to serve as a redundant write buffer.

At operation 725, the processing device updates the metadata for the available cache line to repurpose this portion of the cache to serve as a redundant write buffer. For example, the processing device can set a bit or otherwise update an indicator in the tag or a newly designated metadata sector (e.g., T0 in sector 3) to demonstrate that way 3 is now a redundant write buffer. As described above, such an indication can apply to multiple ways. For example, the indicator can demonstrate that both ways 2 and 3 serve as a redundant write buffer.

At operation 730, the processing device writes a redundant copy of the dirty data to a portion of the redundant write buffer. For example, the processing device writes (or overwrites) sector 0 of way 3 with a redundant copy D0 of the dirty data W0.

At operation 735, the processing device updates a redundant write buffer metadata entry to reference the original location of the dirty data. For example, the processing device can update one or both of the metadata sector T0 and the tag for way 3, sector 0, to store the way, sector value pair (0, 1) for the original copy of the dirty data W0. This update creates a mapping between the original and redundant copies of the dirty data. Additionally, the processing device can update the metadata to indicate that the redundant copy of the dirty data is valid.

Figure 8:
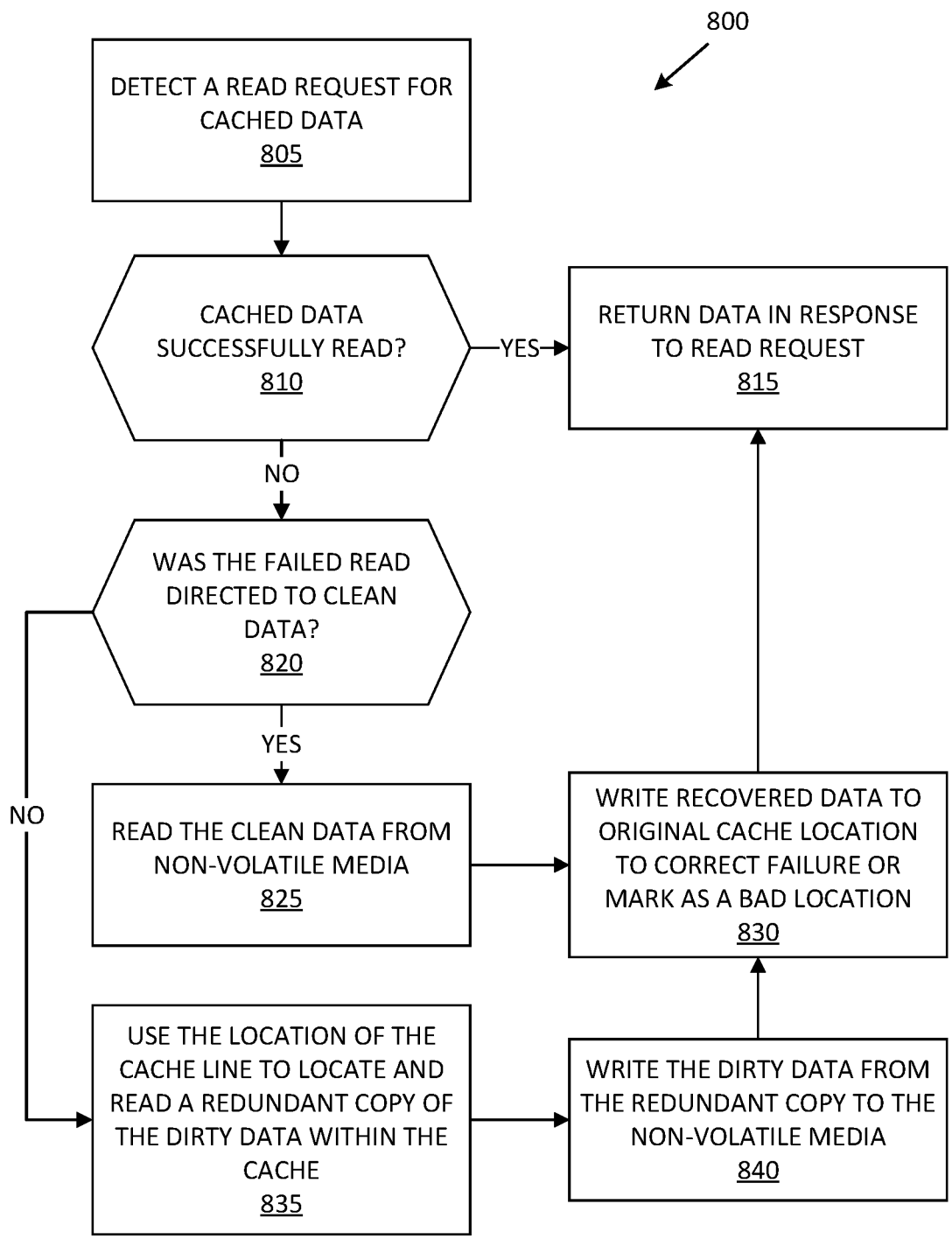
FIG. 8 is a flow diagram of an example method to recover data using a redundant write buffer in accordance with some embodiments of the present disclosure.

FIG. 8 is a flow diagram of an example method 800 to recover data using a redundant write buffer in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the redundant write buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the processing device receives or otherwise detects a read request for cached data. For example, the host system 120 can direct read requests to the memory subsystem 110. The memory subsystem controller 115 determines that the read request is directed to data currently stored in a cache implemented in the memory device 140. Using the cache 200 illustrated in FIG. 2 as an example, the processing device receives or detects a read request for the data W0 in the cache line stored at channel 0, set 0, way 0, sector 1. In response to the read request, the processing device attempts to read this sector.

At operation 810, the processing device determines if the operation successfully read the cached data. For example, the processing device can use an error detection and correction algorithm when reading the sector storing the data. If the error detection and correction algorithm indicates that the data was successfully decoded/read, the method 800 proceeds to operation 815. If the error detection and correction algorithm indicates that the data was not successfully decoded/read, the method 800 proceeds to operation 820.

At operation 815, the processing device returns the data in response to the read request. For example, the memory subsystem 115 directs the data read from the cache to the host system 120 in response to the received read request.

At operation 820, the processing device determines if the failed read operation was directed to clean data. As discussed above, tags for sectors or ways of the cache can include metadata indicating the clean or dirty status of the corresponding portion of the cache. Alternatively, the existence of a redundant data buffer entry for the original cache location can serve as an indication that the data was dirty. The detection of a redundant data buffer entry for the original cache location is described below. If the data that could not be successfully read from the original cache location was clean, the method 800 proceeds to operation 825. If the data that could not be successfully read from the original cache location was dirty, the method 800 proceeds to operation 835.

At operation 825, the processing device reads the clean data from a non-volatile memory. For example, if the processing device fails in attempting to read W0 from channel 0, set 0, way 0, sector 1, but said data was copied from or had been copied to an underlying non-volatile memory device 130, the processing device treats the cache read as a miss and reads the clean data from the non-volatile memory device 130.

At operation 830, the processing device optionally writes the recovered data to the original cache location to correct the failure. For example, if the processing device determines that the failure does not yet satisfy a threshold (e.g., number of failed reads, severity of failure, etc.), the processing device can attempt to continue using the sector. Alternatively, the processing device marks the original cache location as a bad location to prevent future use that can lead to data loss. Furthermore, the processing device returns the data at operation 815, as described above.

At operation 835, the processing device uses the original cache location to locate and read a redundant copy of the dirty data within the cache. In one embodiment, the processing device can locate a redundant write buffer for dirty data in the set having the same value as the original copy, but on a different channel. The processing device parses this set for a way marked as a redundant write buffer and searches the corresponding metadata for an entry for the original data location. The processing device reads the redundant copy of the dirty data from the sector corresponding to the located metadata.

For example, upon a failure to read the original copy of the dirty data W0 at channel 0, set 0, way 0, sector 1, the processing device parses the ways in channel 1, set 0 to locate a redundant write buffer. The processing device detects that channel 1, set 0, way 3 is flagged as a redundant write buffer based upon a metadata indicator and parses the metadata entries, e.g., the data structure T0 stored in sector 3. The data structure T0 includes an entry with the way, sector pair (0, 1) that matches the location of the original dirty data W0. The metadata entry is in a position with the data structure T0 that corresponds to duplicate data D0 stored in channel 1, set 0, way 3, sector 0. The processing device reads this duplicate data D0 to fulfill the read request.

At operation 840, the processing device optionally writes the dirty data from the redundant copy to the non-volatile memory. Given that this dirty data no longer has the benefit of redundancy, a data reliability policy can direct the processing device to write the data to a non-volatile memory device 130 to prevent data loss. The method 800 can optionally proceed to operation 830, as described above, in addition to returning the data at operation 815.

Figure 9:
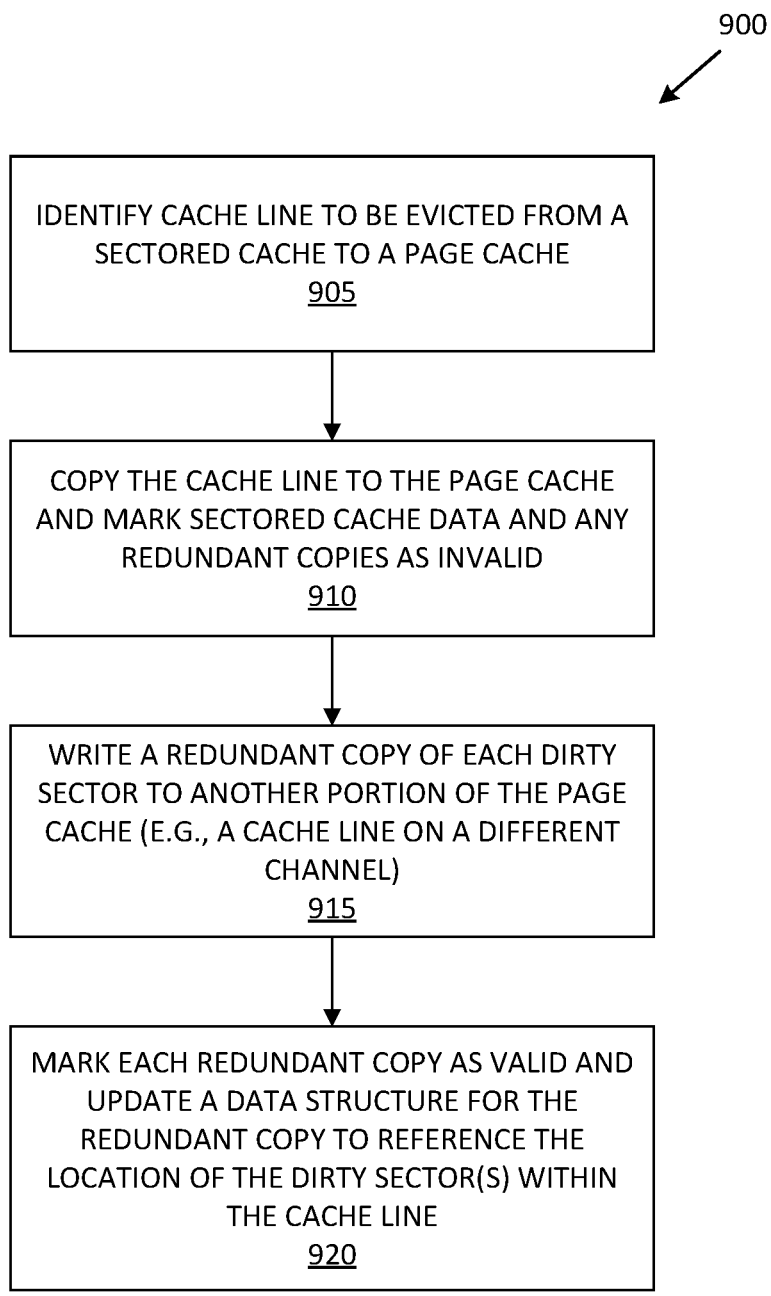
FIG. 9 is a flow diagram of an example method to track the migration of dirty data between caches using a redundant write buffer in accordance with some embodiments of the present disclosure.

FIG. 9 is a flow diagram of an example method 900 to track the migration of dirty data between caches using a redundant write buffer in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the redundant write buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 905, the processing device identifies a cache line to be evicted from one cache to another. For example, the memory subsystem 110 can implement a cache hierarchy with multiple levels of caches within the memory devices 140. The cache levels can include a level-one (L1) processor cache, a level-two (L2) sectored cache, and a level-three (L3) page cache. In such layered approach, e.g., the memory subsystem 110 can evict a cache line from the sectored cache and write the cache line to the page cache.

In one embodiment, the processing device evicts a cache line in response to a trigger event. For example, a trigger can include when an amount of space available for caching data satisfies a threshold value. A need for additional space to store new data can trigger the eviction (or cleaning/flushing) of previously cached data. In evicting previously cached data, the processing device will invalidate redundant copies of dirty data stored in one or more redundant write buffers. As another example, a need for additional redundant buffer space to store new dirty data duplicates can trigger the eviction of previously cached dirty data. When the available space in a redundant write buffer satisfies a threshold value, the processing device cleans or evicts cache lines with dirty data duplicated to the redundant write buffer, thus removing a need to store duplicate dirty data for the cleaned/evicted data.

At operation 910, the processing device copies the cache line from the sectored cache to the page cache. As described above, a page cache maintains limited metadata in comparison to a sectored cache. For example, a conventional page cache tag can maintain a dirty/clean indicator for a cache line but may not include dirty/clean indicators for each sector. Caches implementing a redundant write buffer as described above, however, can track the dirty/clean status of sectors outside of the tag metadata. As such, the processing device can copy the cache line containing dirty data from the sectored cache to the page cache without cleaning the data and while continuing to track the dirty/clean status of individual sectors. In copying the data from the sectored cache to the page cache, the processing device invalidates the cache line and redundant copies in the sectored cache.

At operation 915, the processing device writes a redundant copy of each dirty sector to another portion of the page cache. For example, the processing device can utilize operations 715-730 as described above to add a redundant copy of dirty data to a redundant write buffer.

At operation 920, the processing device marks each redundant copy as valid and updates the redundant write buffer metadata to map the redundant copy of the dirty data to the original copy of the dirty data. For example, the processing device can utilize operation 735 as described above to update the metadata for the redundant copy of dirty data.

Figure 10:
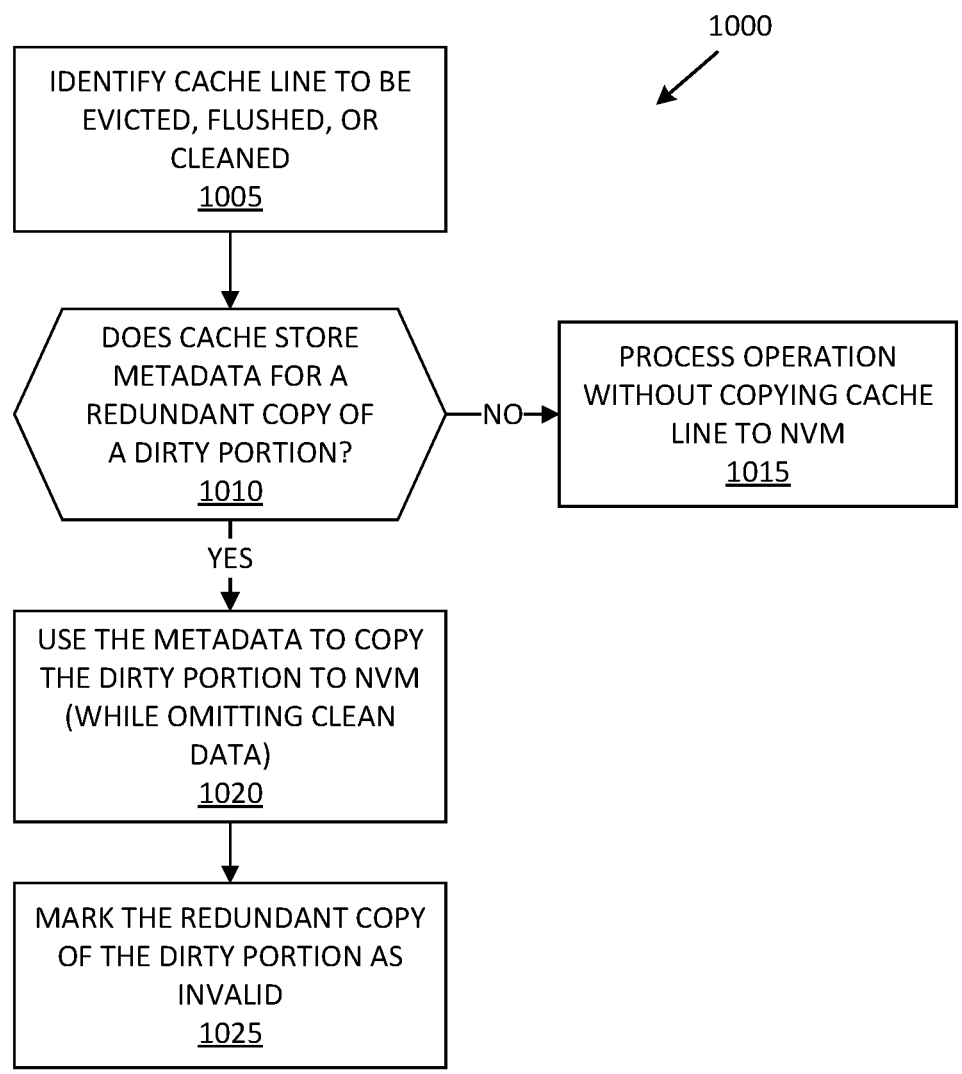
FIG. 10 is a flow diagram of an example method to copy dirty data to non-volatile media using a redundant write buffer in accordance with some embodiments of the present disclosure.

FIG. 10 is a flow diagram of an example method 1000 to copy dirty data to non-volatile media using a redundant write buffer in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the redundant write buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1005, the processing device identifies a cache line to be evicted, flushed, or cleaned. As described above, the memory subsystem 110 can implement a cache hierarchy with multiple levels of caches within the memory devices 140. Based upon similar triggers as discussed above, the processing device evicts, flushes, or cleans data by copying dirty data from the page cache in volatile memory 140 to the underlying non-volatile memory 130.

At operation 1010, the processing device determines if the cache stores metadata for a redundant copy of any dirty data in the cache line. Given that a page cache does not store a dirty/clean indicator for sectors in a tag for the cache line, the processing device identifies dirty sectors by parsing the redundant write buffer metadata. If the processing device fails to locate any dirty data "sectors" (sector-sized portions of the cache line being evicted) referenced by location in the metadata, the method 1000 proceeds to operation 1015. Alternatively, if the tag for the cache line being evicted indicates that the entire cache line is clean, the method 1000 proceeds to operation 1015. If the processing device locates one or more sectors referenced by location in the metadata, the method 1000 proceeds to operation 1020.

At operation 1015, the processing device processes the operation without copying the cache line data to the non-volatile memory 130. Given that the cache line includes no dirty data, no data needs to be copied to the non-volatile memory 130 and the cache line can be invalidated or otherwise processed for eviction.

At operation 1020, the processing device uses the detected metadata to copy the dirty portion of the cache line to the non-volatile memory device 130 while omitting clean data. For example, the processing device uses the dirty data locations referenced by the redundant write buffer metadata to copy the sectors of dirty data from the cache line to the non-volatile memory 130. Any remaining data in the cache line, being clean, does not need to be copied to the non-volatile memory 130. Additionally, the cache line can be invalidated or otherwise processed for eviction.

At operation 1025, the processing device updates the metadata for the redundant copies of dirty data as invalid. With the original dirty data being evicted, flushed, or otherwise cleaned, the processing device can free up the redundant write buffer space that stored the redundant copies. For example, the processing device can update a bit or other indicator in a tag for repurposed cache line to demonstrate that the one or more sectors are now invalid.

Figure 11:
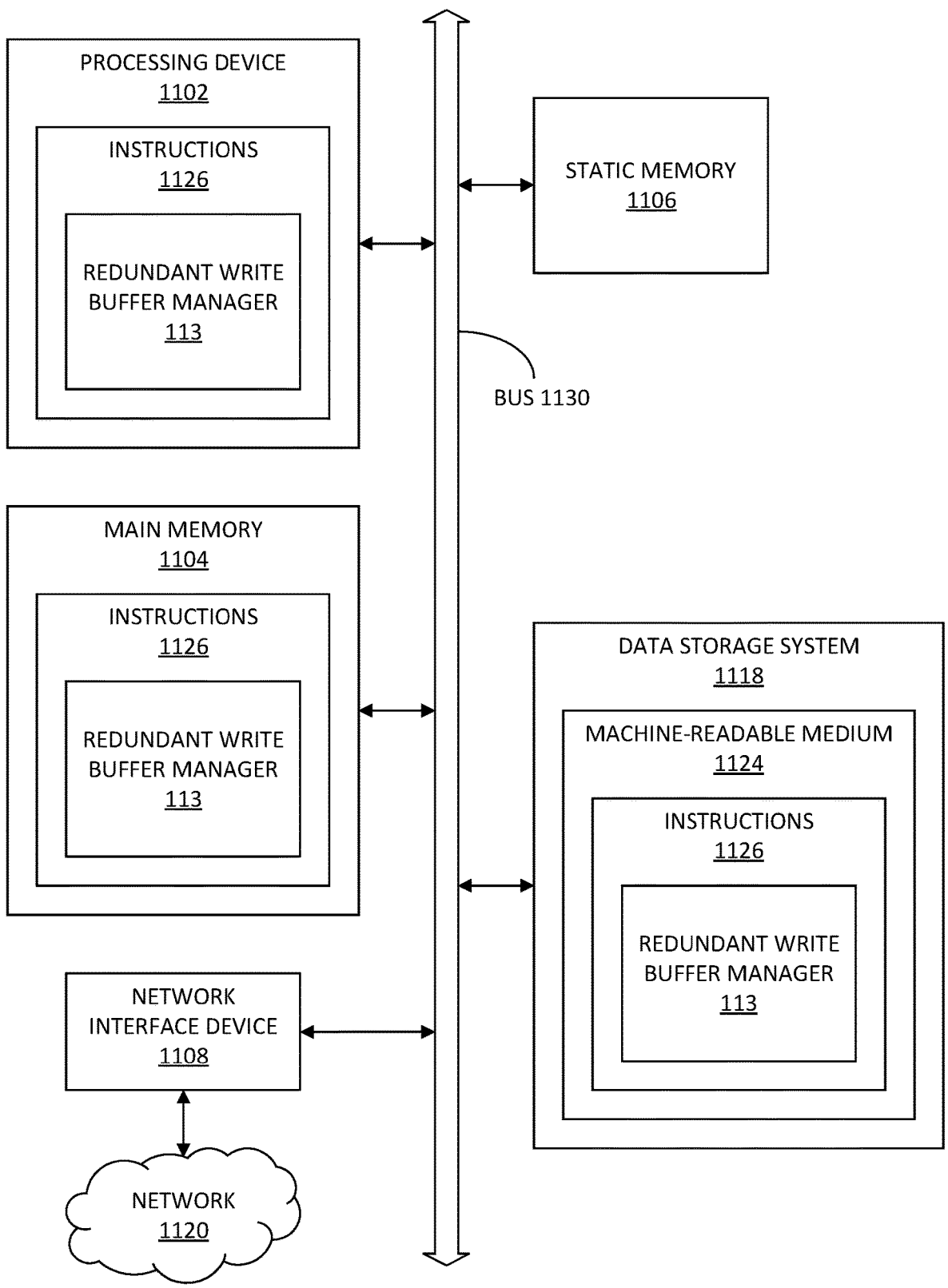
FIG. 11 is a block diagram of an example computer system in which embodiments of the present disclosure may operate.

FIG. 11 illustrates an example machine of a computer system 1100 within which a set of instructions, for causing the machine to perform any one or more of the methodologies discussed herein, can be executed. In some embodiments, the computer system 1100 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the redundant write buffer manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random-access memory (DRAM) such as synchronous DRAM (SDRAM) or Rambus DRAM (RDRAM), etc.), a static memory 1106 (e.g., flash memory, static random-access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to the memory subsystem 110 of FIG. 1.

In one embodiment, the instructions 1126 include instructions to implement functionality corresponding to a redundant write buffer manager (e.g., the redundant write buffer manager 113 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 700-1000 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   detecting an operation to write dirty data to a cache, wherein the cache is divided into a plurality of channels and further divided into a plurality of sets addressed via set values;
   writing the dirty data to a first cache line in the cache, wherein the first cache line is accessed via a first channel;
   selecting a second cache line for writing a redundant copy of the dirty data, wherein the second cache line is accessed via a second channel and selected because the first and second cache lines have a same set value on different channels; and
   writing the redundant copy of the dirty data to the second cache line in the cache, wherein the second cache line serves as a redundant write buffer.

2. The method of claim 1, further comprising:
   updating a metadata entry for the second cache line to reference a location of the dirty data in the first cache line.

3. The method of claim 2, wherein the cache is further divided into a plurality of ways and sectors, and wherein the metadata entry for the second cache line to reference the location of the dirty data in the first cache line includes a value for a way for the first cache line and a value for a sector within the first cache line.

4. The method of claim 1, further comprising:
   detecting a failure of a read request directed to a location of the dirty data in the first cache line;
   in response to detecting that the failed read request was directed to dirty data, using the location of the dirty data in the first cache line to locate and read the redundant copy of the dirty data in the second cache line; and
   returning the dirty data in response to the read request.

5. The method of claim 4, wherein using the location of the dirty data in the first cache line to locate and read the redundant copy of the dirty data in the second cache line includes using the set value of the dirty data in the first cache line to parse the same set value on the second channel to locate the redundant copy of the dirty data.

6. The method of claim 5, wherein parsing the same set value on the second channel includes parsing for a way marked as a redundant write buffer and corresponding metadata that references a location of the dirty data in the first cache line.

7. The method of claim 4, further comprising:
   writing the dirty data to non-volatile media in response to detecting that the failed read request was directed to dirty data.

8. A non-transitory computer-readable storage medium comprising instructions that, when executed by a processing device, cause the processing device to:

detect an operation to write dirty data to a cache, wherein the cache is divided into a plurality of channels and further divided into a plurality of sets addressed via set values;

write the dirty data to a first cache line in the cache, wherein the first cache line is accessed via a first channel;

select a second cache line for writing a redundant copy of the dirty data, wherein the second cache line is accessed via a second channel and selected because the first and second cache lines have a same set value on different channels; and write the redundant copy of the dirty data to the second cache line in the cache, wherein the second cache line serves as a redundant write buffer.

9. The non-transitory computer-readable storage medium of claim 8, wherein the processing device is further to:

update a metadata entry for the second cache line to reference a location of the dirty data in the first cache line.

10. The non-transitory computer-readable storage medium of claim 9, wherein the cache is further divided into a plurality of ways and sectors, and wherein the metadata entry for the second cache line to reference the location of the dirty data in the first cache line includes a value for a way for the first cache line and a value for a sector within the first cache line.

11. The non-transitory computer-readable storage medium of claim 8, wherein the processing device is further to:

detect a failure of a read request directed to a location of the dirty data in the first cache line;

in response to detecting that the failed read request was directed to dirty data, use the location of the dirty data in the first cache line to locate and read the redundant copy of the dirty data in the second cache line; and return the dirty data in response to the read request.

12. The non-transitory computer-readable storage medium of claim 11, wherein using the location of the dirty data in the first cache line to locate and read the redundant copy of the dirty data in the second cache line includes using the set value of the dirty data in the first cache line to parse the same set value on the second channel to locate the redundant copy of the dirty data.

13. The non-transitory computer-readable storage medium of claim 12, wherein parsing the same set value on the second channel includes parsing for a way marked as a redundant write buffer and corresponding metadata that references a location of the dirty data in the first cache line.

14. The non-transitory computer-readable storage medium of claim 11, wherein the processing device is further to:

write the dirty data to non-volatile media in response to detecting that the failed read request was directed to dirty data.

15. A system comprising:

a plurality of memory components; and a processing device, operatively coupled with the plurality of memory components, to:

detect an operation to write dirty data to a cache, wherein the cache is divided into a plurality of channels and further divided into a plurality of sets addressed via set values;

write the dirty data to a first cache line in the cache, wherein the first cache line is accessed via a first channel;

select a second cache line for writing a redundant copy of the dirty data, wherein the second cache line is accessed via a second channel and selected because the first and second cache lines have a same set value on different channels;

write the redundant copy of the dirty data to the second cache line in the cache, wherein the second cache line serves as a redundant write buffer; and update a metadata entry for the second cache line to reference a location of the dirty data in the first cache line.

16. The system of claim 15, wherein the cache is further divided into a plurality of ways and sectors, and wherein the metadata entry for the second cache line to reference the location of the dirty data in the first cache line includes a value for a way for the first cache line and a value for a sector within the first cache line.

17. The system of claim 15, wherein the processing device is further to:

detect a failure of a read request directed to a location of the dirty data in the first cache line;

in response to detecting that the failed read request was directed to dirty data, use the location of the dirty data in the first cache line to locate and read the redundant copy of the dirty data in the second cache line; and return the dirty data in response to the read request.

18. The system of claim 17, wherein using the location of the dirty data in the first cache line to locate and read the redundant copy of the dirty data in the second cache line includes using the set value of the dirty data in the first cache line to parse the same set value on the second channel to locate the redundant copy of the dirty data.

19. The system of claim 18, wherein parsing the same set value on the second channel includes parsing for a way marked as a redundant write buffer and corresponding metadata that references a location of the dirty data in the first cache line.

20. The system of claim 17, wherein the processing device is further to:

write the dirty data to non-volatile media in response to detecting that the failed read request was directed to dirty data.

* * * * *